(12) United States Patent
Andruk et al.

(10) Patent No.: US 7,586,289 B2
(45) Date of Patent: Sep. 8, 2009

(54) COMPLETE DISCHARGE DEVICE

(75) Inventors: Wayne Andruk, Yonkers, NY (US);
Michael Manna, Canandaigua, NY (US)

(73) Assignee: Ultralife Corporation, Newark, NY (US)

( * ) Notice: Subject to any disclaimer, the term of this patent is extended or adjusted under 35 U.S.C. 154(b) by 388 days.

(21) Appl. No.: 11/419,966

(22) Filed: May 23, 2006

(65) Prior Publication Data

US 2007/0273333 A1  Nov. 29, 2007

(51) Int. Cl.
  *H02J 7/00*  (2006.01)
(52) U.S. Cl. .......................... 320/112; 320/115; 429/7; 429/100
(58) Field of Classification Search .................. 320/107, 320/112, 113, 115, 114; 429/50, 99, 110, 429/7
See application file for complete search history.

(56) References Cited

U.S. PATENT DOCUMENTS

| | | | |
|---|---|---|---|
| 5,250,904 A * | 10/1993 | Salander et al. | 324/430 |
| 5,758,224 A | 5/1998 | Binder et al. | |
| 6,121,753 A * | 9/2000 | Walker et al. | 320/132 |
| 6,208,115 B1 | 3/2001 | Binder | |
| 6,270,916 B1 * | 8/2001 | Sink et al. | 429/7 |
| 7,190,147 B2 * | 3/2007 | Gileff et al. | 320/127 |
| 2004/0012374 A1 | 1/2004 | Kamenoff | |
| 2004/0115528 A1* | 6/2004 | Helmich | 429/181 |
| 2005/0194927 A1 | 9/2005 | Gileff et al. | |
| 2005/0196667 A1 | 9/2005 | Brand | |

OTHER PUBLICATIONS

Alcatel; Doughty Hanson & Company; Press Release, Paris Jan. 14, 2004: Alcatel and Doughty Hanson announce the closing of the Saft transaction; www.alcatel.com; www.saftbatteries.com; 1 page.
Document Security; Summit Printing; A Guide to Document Security from the Appleton Papers "Your Guide to Document Security"; 12 Webpages.
International Ink Company LLC; Security and specialty ink manufacturer; www.iicink.com; 1 Webpage.
Military Handbook: Department of Defense Handbook; General Guidelines for Electronic Equipment; MIL-HDBK-454A Nov. 2000; 194 Pages.
Military Regulation; GPM 2000-002, DTG 161901Z Jun. 2000; Subject CECOM Ground Precautionary Message (CECOM GPM 2000-002), Lithium Sulfur Dioxide Batteries; 3 pages.

(Continued)

*Primary Examiner*—Akm E Ullah
*Assistant Examiner*—Nguyen Tran
(74) *Attorney, Agent, or Firm*—Duane C. Basch; Basch & Nickerson LLP

(57) ABSTRACT

An apparatus and method for completely discharging a battery by use of a tab that initiates activation of a discharging circuit when the tab is pulled out of the battery case. The tab is operatively coupled with the actuator of a switch which in turn is coupled to a discharging circuit. The tab extends from the battery case and may be covered by a protective cover, or may also be attached to the protective cover. The tab is attached to an actuator of a switch and detaches from the actuator after actuation, thereby indicating actuation and preventing the switch from subsequently being moved. The switch completes the circuit, initiating the discharging process, when a movable contact engages a stationary contact and completes the discharge circuit.

15 Claims, 13 Drawing Sheets

OTHER PUBLICATIONS

SW Slide; C&K AYZ Series Miniature Slide Switches; Specifications; Cannon; ITT Industries; www.ittcannon.com; 3 pages.
Temp Tell Thermochromatic Inks from International Ink Company; Product Details & Technical Data Sheet; International Ink Company LLC; www.iicink.com; 2 pages.
Ultralife Batteries, Inc.; Transportation Regulations for Lithium, Lithium Ion and Polymer Cells and Batteries; c. 2003-2005 Ultralife Batteries, Inc.; UMB-5120; Jan. 11, 2005 Revision K; 9 pages.

* cited by examiner

COMPLETE DISCHARGE DEVICE

The field of the present invention is electrical discharge devices, and more particularly discharge devices and methods for activation of such devices in batteries.

BACKGROUND AND SUMMARY

A complete discharge device generally consists of a resistance component and an activation component to discharge a battery completely to less than 1.0 volt/cell before disposal of the battery. The incorporation of a complete discharge device into a lithium battery is intended to consume residual energy in the battery, thereby making the lithium non-reactive. In most jurisdictions, non-reactive lithium qualifies as non-hazardous waste for disposal purposes. In other words, without the discharge of the residual energy in the lithium battery, the lithium battery would have to be disposed in accordance with procedures for handling hazardous wastes.

As noted above, conventional complete discharge devices include various combinations of switches, activation methods, and resistors. Examples of batteries with conventional complete discharge devices are the BA-5590 (Li/SO2) battery, as manufactured by Saft America, Inc. and the BA-5390 as manufactured by Ultralife Batteries, Inc. In this battery, a pair of contacts, made from spring contacts biased toward each other, and an insulating pull-tab arrangement therebetween, is used in conjunction with a resistive circuit. It is also believed that prior designs of complete discharge devices included a rigid plastic rod that was pushed into the battery to activate the discharge operation (e.g., Li/SO2 cells formerly manufactured by Hawker Energy Products, Inc., now EnerSys Energy Products Inc of Warrensburg, Mo.).

There are, however, inherent disadvantages in the use of an insulating tab separating contact points; both from a manufacturing as well as a performance standpoint. If the spring loses its bias while in use, the removal of the tab would not activate the circuit. Similarly, the tab material must be resistant to deformation by the contacts, and must be resistant to movement until complete discharge is desired. A further potential problem when using a tab or material between the contacts is that during removal of the tab, residual material remains on the contacts and prevents activation of the discharge circuit.

Another problem inherent in methods of complete discharge is a lack of positive confirmation that discharge has taken place. In the example mentioned above, of failure to initiate discharge, the user would see that the tab has been pulled but will not readily know whether the discharge of the battery was actually initiated. It is desirable to maintain the same general format for the activation of the complete discharge device circuit, so that a common method of activation of the device would exist regardless of manufacturer. Accordingly the present disclosure is directed to several improvements to complete discharge device (CDD) activation circuits, and batteries employing such circuitry, while maintaining the known method of activating a CDD, by pulling a tab out of an aperture in the battery housing.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION

Figure 1:
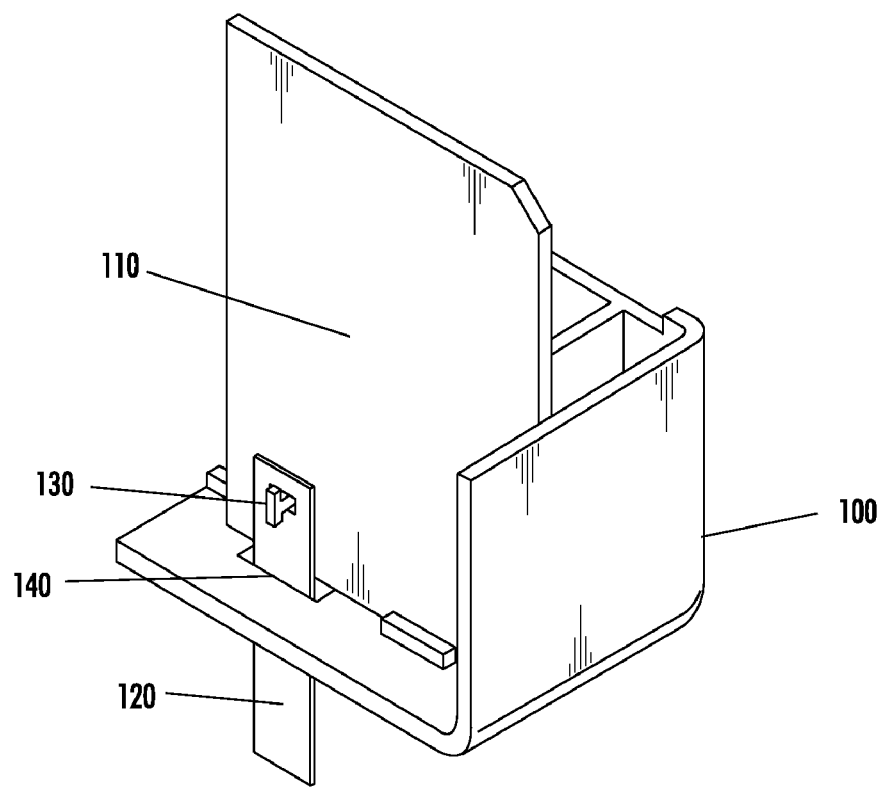
FIG. 1 is a cut-away diagram illustrating an apparatus to completely discharge a battery.

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention, as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions may be purposely drawn disproportionately so that the features and concepts of the present invention could be properly illustrated.

In reference now to FIG. 1, a cut-away diagram illustrating an apparatus to completely discharge a battery is shown. The diagram shows a switch with an actuator 130, the actuator 130 having a tab 120. The switch is operatively coupled to a discharge circuit 110, connected to the battery. The discharge circuit includes any of several known designs and components suitable for causing the discharge of the battery in accordance with its disposal requirements. The tab 120 extends through an aperture 140 in the battery case 100. In order to completely discharge the battery, a user pulls the tab 120 out of the battery case. As the tab 120 is pulled, the tension in the tab 120 exerts a force on the actuator 130, which causes the actuator 130 to move the contacts of the switch into an activated position. The activated or "closed" position is the position at which a circuit including the poles of the battery, the discharging circuit and the contacts of the switch is completed, thus initiating the complete discharge of the battery. Continued pulling of the tab 120 after the actuator of the switch is in the activated position does not cause further motion of the actuator of the switch; instead, the continued tension on the tab 120 may, in some embodiments, cause the tab 120 to detach from the actuator 130, thereby removing the tab 120 from the battery case 100.

Figure 2:
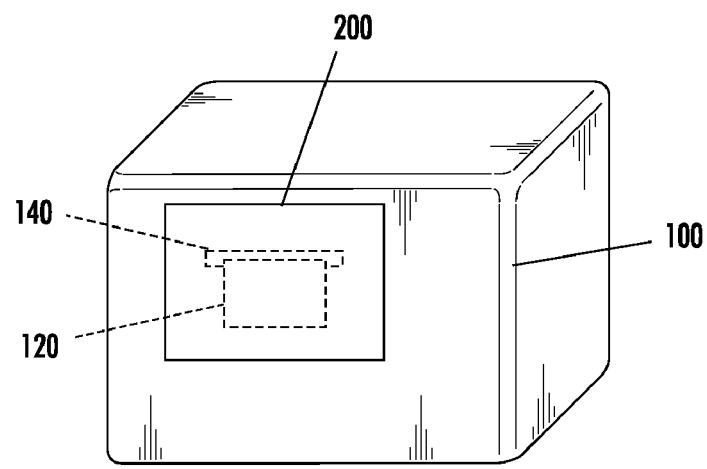
FIG. 2 is a diagram illustrating a protective cover on a battery case covering a tab.

In reference now to FIG. 2, there is shown a protective cover 200 on the outside of the battery case 100 that covers an end of the tab 120. The protective cover 200 may be in the form of an adhesive-backed label or similar material suitable for preventing the tab 120 from being exposed by inadvertent contact or during conventional use of the battery. The protective cover 200 may be easily removed by peeling. Various other alternatives, modifications, variations or improvements of the protective cover and the method of attaching the protective cover to the battery case presently unforeseen or unanticipated, may be subsequently made by those skilled in the art which are also intended to be encompassed herein.

It is noted that the tab 120, in one embodiment, while extending through the aperture in the battery case is nevertheless folded to prevent the protective cover 200 from protruding from the battery case 100. However, it is not a requirement that the tab 120 be folded. When the protective cover 200 is removed, the tab 120 is exposed and can then be pulled out of the battery case 100 to initiate the complete discharge of the battery as described above.

In an alternate embodiment, the tab 120 is attached to the protective cover 200. When the protective cover 200 is removed, the tab 120 is simultaneously pulled out of the battery case and the discharge of the battery as described above is initiated. In a further alternative embodiment the tab 120 may be formed by or affixed to a removable portion of the battery case, such that when the portion is removed the tab is withdrawn and thereby causes the completion of the discharge circuit.

Figure 3:
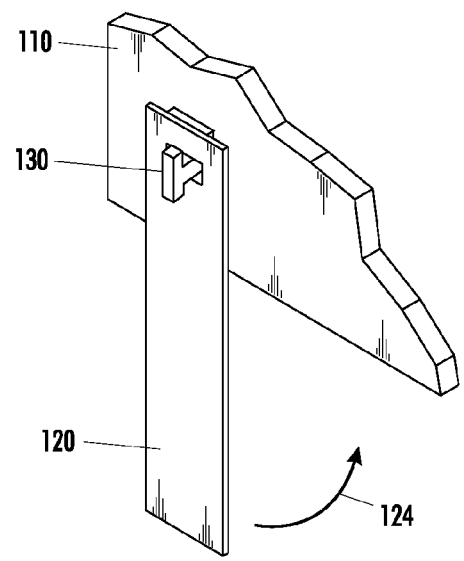
FIG. 3 is a diagram illustrating a tab, a switch, and a discharge circuit board assembly.

Referring now to FIG. 3, a diagram partially illustrating the assembly including the tab 120, the actuator 130 and the discharge circuit 110 is shown. It is noted that the tab 120 is attached to the actuator 130 by a hole or a similar shaped receiver in the tab 120. The hole is formed in the shape of a portion of the actuator 130 but in an operative position is rotated thereabout, for example ninety degrees. When the tab 120 is rotated into the operative position (as indicated by arrow 124), the shape of the hole causes the tab 120 to remain attached to the actuator 130 since the free or unattached end of the tab 120 is held in the operative position by the aperture in the battery case (see FIG. 1). It is noted that the shape of the portion of the actuator 130 is generally T-shaped, which shape adapts well to the attachment scheme illustrated for coupling the actuator 130 with the tab 120. It is noted that other shapes (e.g., angles, hooks, expanded ball on end of shaft) may also naturally form a coupling for the actuator and the tab 120. As described some of the attachment schemes require that the tab be rotated through an angle and held in that position by the aperture in the battery case constraining the other end of the tab 120.

Figure 4:
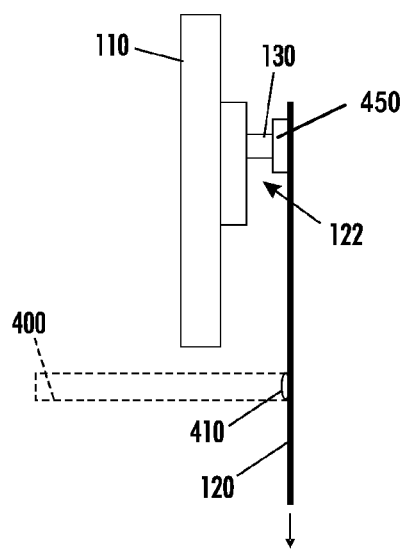
FIG. 4 is a diagram illustrating a side view of a tab, a switch and a discharge circuit board assembly.

In reference now to FIG. 4, the tab 120 is attached to the actuator 130 of the switch 122, by an adhesive or an epoxy bond 450. It is noted that the tab 120 may also be attached to the actuator 130 by heat staking or thermosetting, depending on the materials used. In this illustration, a side view is presented showing a possible shape of an actuator 130 of the switch 122 which is operatively and electrically attached to the discharging circuit (110). It is noted that the actuator 130 is attached to the tab 120. During the process of pulling the tab 120 from the battery case, the tab 120 becomes detached from the actuator 130. The adhesive or epoxy bond may be too strong to be broken by the continued tension on the tab, in which case the tab 120 may be a perforated tab 120 to facilitate tearing of the tab 120 as the method for detaching the tab 120 from the actuator 130 of the switch.

In an alternative embodiment, in addition to being attached to the actuator 130, it is also contemplated that the tab 120 may be temporarily affixed by an attaching structure 400 and temporary adhesive 410 of the same or similar material to a circuit board or similar structure on which circuit 110 is placed. In such an embodiment, the tab is prevented from being inadvertently removed by improper handling or shipment of the battery, and the user must first pull the tab with sufficient force to disengage it from the attaching structure 400 and temporary adhesive 410 before further pulling of the tab activates the switch and the discharge circuit 110.

Figure 5:
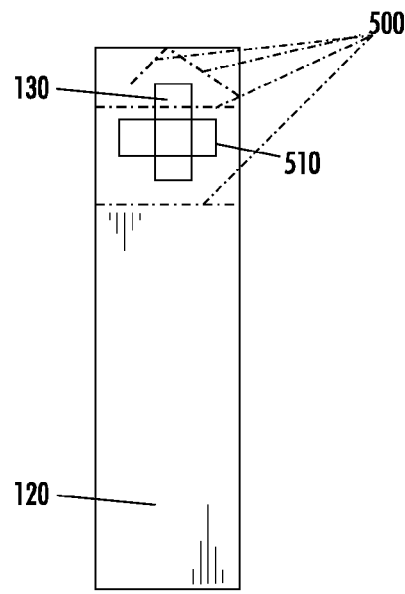
FIG. 5 is a diagram illustrating a perforated tab.

In reference now to FIG. 5, a tab 120 is shown attached to an actuator 130 of a switch by a rectangular receiver or hole 510. Lines of possible locations for perforations 500 in the tab 120 are shown. It is noted that various perforation designs besides the ones here illustrated may be employed to facilitate the decoupling of the tab 120 from the actuator 130.

Furthermore, a line of perforations 500 is not necessary to enable the decoupling of the tab 120 from the actuator 130. The tab 120 may be constructed of material with sufficient tensile strength to move the actuator 130 into the activated position but insufficient tensile strength to prevent the tab 120 from tearing away from the actuator 130 in response to continued tension on the tab 120 after the actuator of the switch is moved to the activated position.

Figure 6:
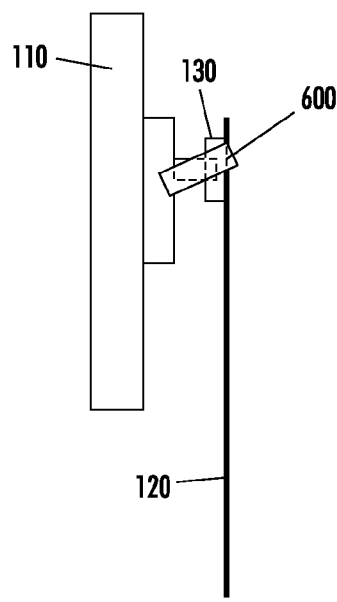
FIG. 6 is a diagram illustrating the use of binding tape with the tab.
Figure 7:
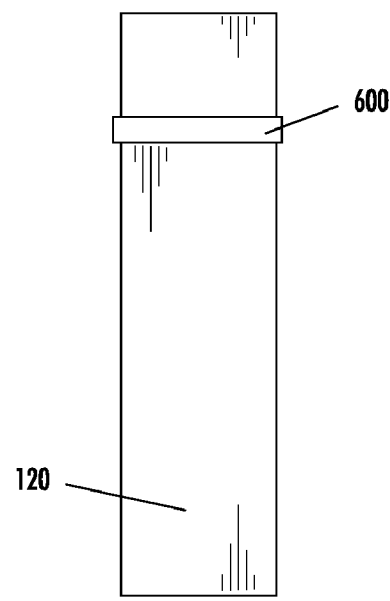
FIG. 7 is a diagram illustrating another view of a tab with binding tape.

Referring also to FIGS. 6 and 7, a tab 120 attached to an actuator 130 by a binding tape 600 is shown. The binding tape 600 is attached to the front of the tab 120 and to the actuator 130 and binds the actuator 130 to the tab 120. It is noted that the binding tape 600 may be constructed of material with sufficient tensile strength to continue to bind the tab 120 and the actuator 130 while the force of pulling the tab 120 out of the battery case causes tension in the tab 120 and the binding tape 600. When the actuator of the switch is in the activated position the tensile strength of the binding tape should not prevent the decoupling of tab 120 from the actuator 130 when further pulling force is applied.

Various presently unforeseen or unanticipated alternatives, modifications, variations or improvements in the method of attaching the tab 120 to the actuator 130 using shaped receivers, adhesives, binding tape, and the like, both alone and in combination, may be subsequently made by those skilled in the art, and are also intended to be encompassed herein.

As the examples of FIGS. 6 and 7 illustrate, the tab 120, in the various embodiments disclosed herein, may be constructed from a variety of materials known to those skilled in the art. The tab 120 may be constructed of electrically conductive material or electrically non-conductive material, as well as combinations thereof. The tab 120 must be of sufficient tensile strength to withstand the force needed to move the actuator of the switch to the activated position. The tensile strength required of the tab is proportional to the activation force needed to move the actuator of the switch into the activated position. The activation force needed is, in turn determined to a large extent by the design of the switch, including for example, the force that is applied by the spring member of the switch. Further details of the construction of the switch are discussed below.

The choice of material for the tab 120 depends on the force needed to move the actuator of the switch into the activated position. The activated position is the position at which a circuit including the poles of the battery, the discharging circuit and the contacts of the switch is completed, thus initiating the discharge of the battery.

The tab 120 should be detached from the actuator 130 once the actuator is in the activated position to prevent the actuator from inadvertently returning to the non-activated position. As described above, there are a variety of ways to facilitate such a decoupling feature.

Also, as is known to those skilled in the art, a discharging circuit that cannot be deactivated once it has been activated may be employed. In that case, an inadvertent movement of the actuator out of the activated position would not cause the discharge of the battery to be interrupted once it has been initiated.

Figure 8:
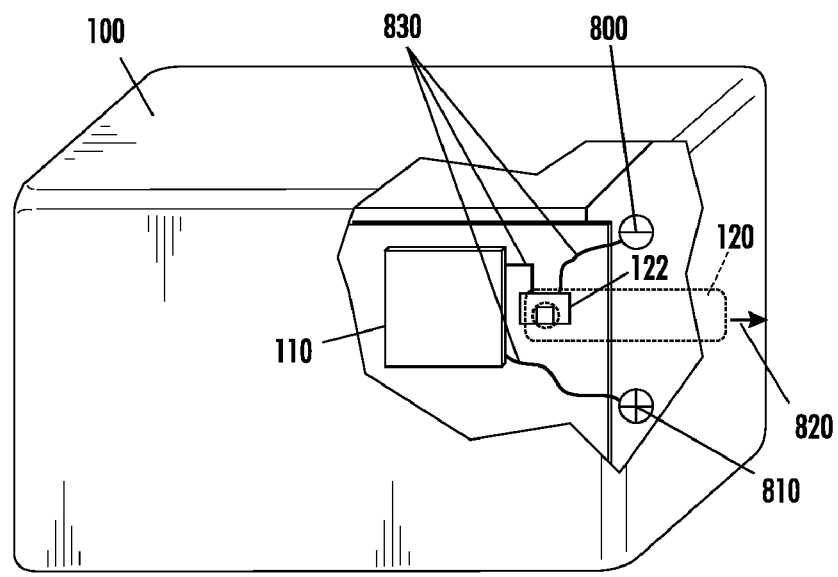
FIG. 8 is a cut-away diagram illustrating a configuration of a battery with a complete discharge device.

In reference now to FIG. 8, a cut-away diagram illustrating a configuration of a battery with a complete discharge device is shown. Discharging circuit 110 is shown electrically attached to the switch 130 by a wire connections 830. The switch, in turn is electrically attached to either the positive or negative poles (800, 810) of the battery, by a wire connection 830. Furthermore, the discharging circuit 110 is electrically attached to the alternate pole of the battery by a wire connection 830. It is noted that various alternatives, modifications, variations or improvements in ways to electrically attach a switch, a circuit and the poles of a battery within the battery may be subsequently made by those skilled in the art, and which are also intended to be encompassed herein.

The tab 120 is shown operatively attached to the actuator 130. The arrow 820 shows the direction in which the tab must be pulled to activate the switch.

Figure 9A:
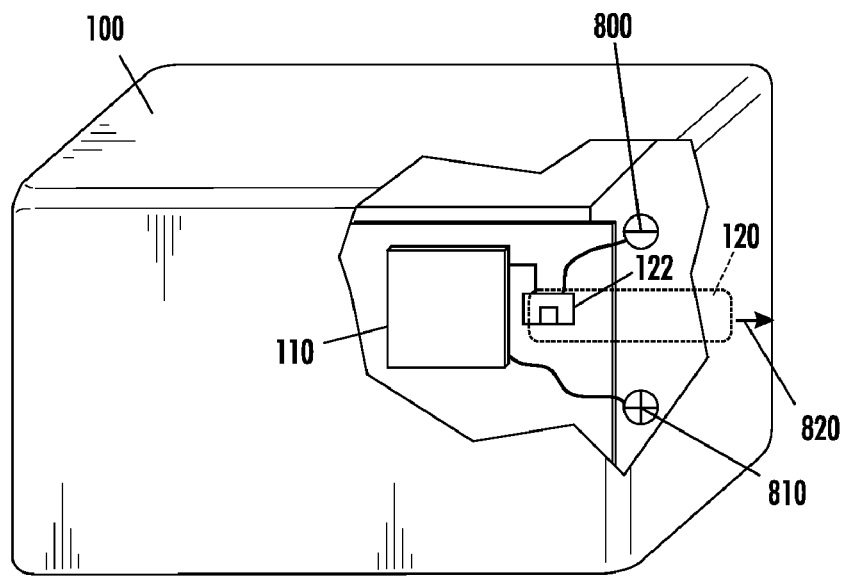
FIG. 9 is a cut-away diagram illustrating a battery before and after use of a tab.
Figure 9B:
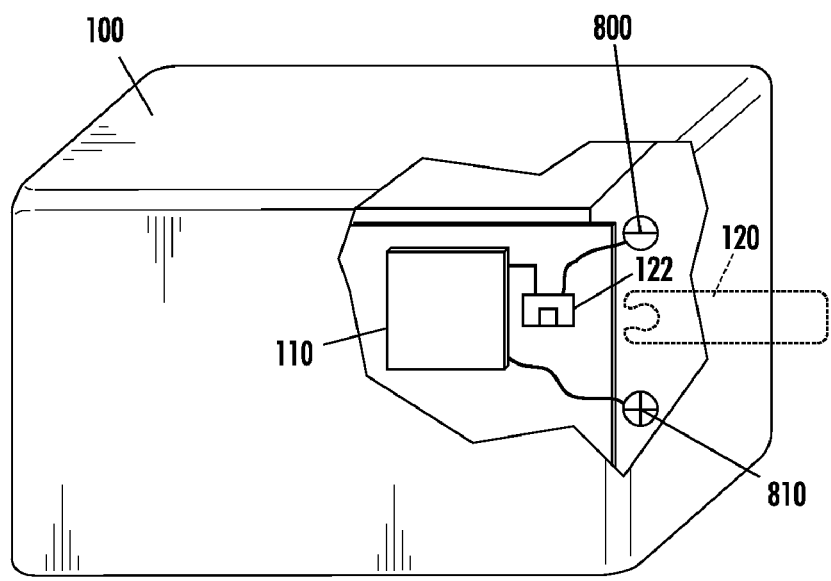

In reference now to FIGS. 9A and 9B, the figures respectively illustrate cut-away diagrams for a battery during and after use of the tab 120. As depicted, the tab 120 is pulled in the direction indicated by arrow 820, and the actuator 130 moves the switch to a position to cause the complete discharge circuit 110 to initiate the complete discharge of the battery.

Figure 10:
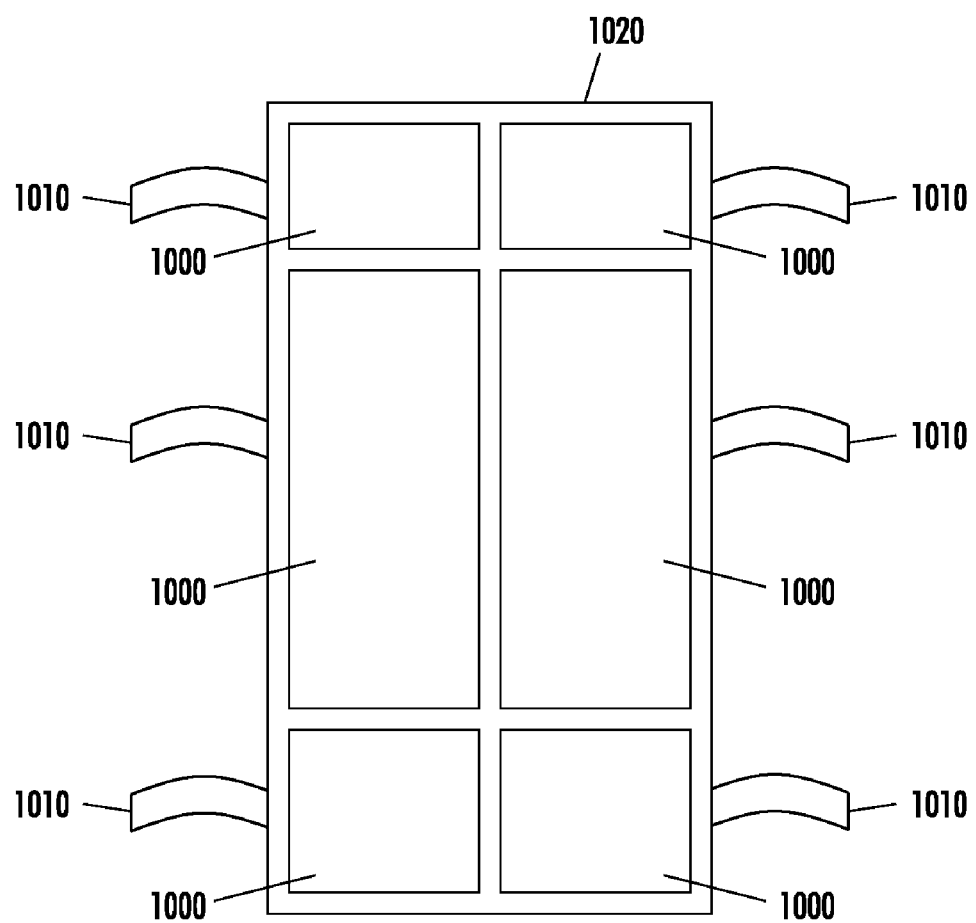
FIG. 10 is a diagram illustrating the base of a switch.

Turning now to FIG. 10, depicted therein is the base of an electrical switch that can be used to activate a complete discharge circuit for a battery. In this illustration, the base 1020 material is electrically insulative and provides a separation between the end and center contacts 1000 found on both sides. Each of the contacts has gull wing leads 1010 which provide the surface mount configuration for soldering and electrical connection to a printed circuit board, which circuit board may include a discharging circuit for a battery. It will also be appreciated that the switch base may take on alternative configurations, including through-hole leads.

Figure 11:
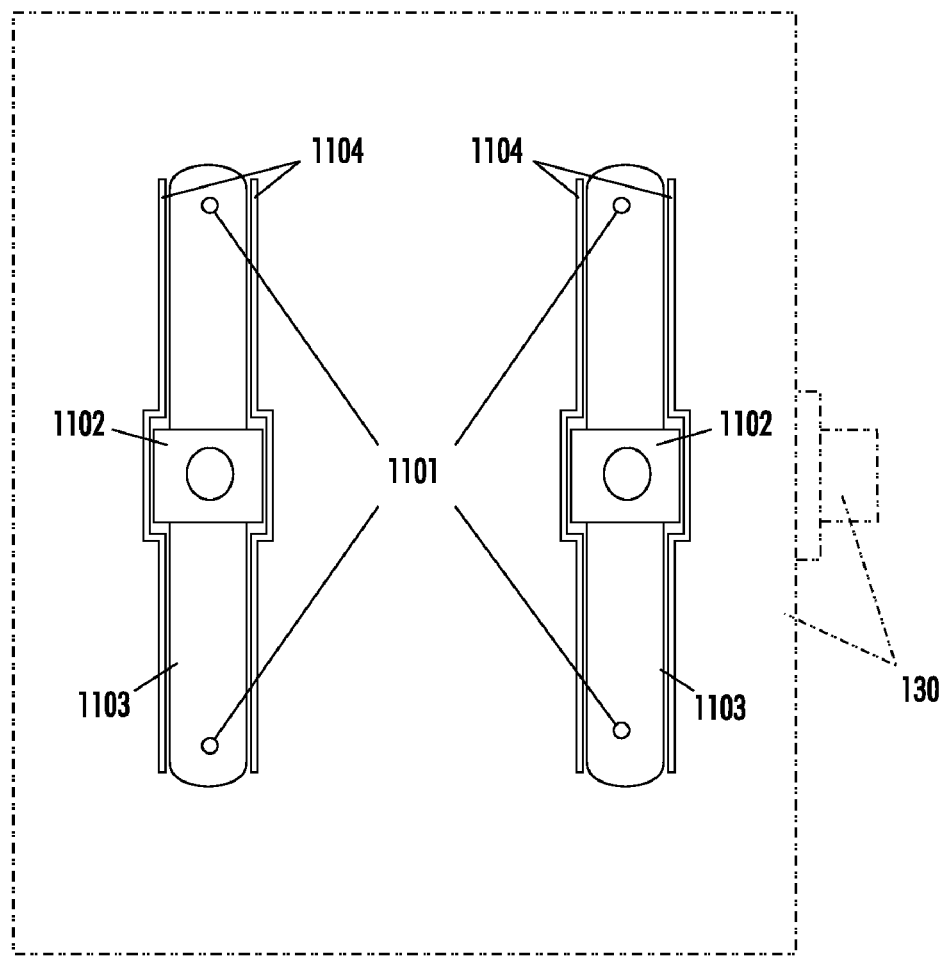
FIG. 11 is a diagram illustrating a set of slide contacts operatively coupled to an actuator for a switch.

Referring also to FIG. 11, there is depicted a diagram illustrating a set of slide contacts 1103 relative to their position when operatively attached to an actuator 130 for a switch. The position of the slide contacts 1103 in the fully assembled switch would be between the actuator 130 and the previously described base 1020 according to FIG. 10. The stationary contacts 1000 of the base face the slide contacts 1103. Any method known in the art may be used to operatively couple the slide contacts 1103 with the actuator 130, including but not limited to, heat staking, adhesive, injection-molded inserts, etc. In one embodiment, the actuator may have two pairs of parallel ribs 1104, each pair securing one slide contact 1103.

It is noted that each of the slide contacts 1103 has a larger square area 1102 at the mid-point including a hole in the center of the larger square area 1102 itself. In an embodiment as described above, the larger square area 1102 can be used to operatively couple and secure each slide contact 1103 with the actuator 130. Each of the slide contacts 1103 contains two points of contact 1101 which may complete a circuit when they come in contact with the stationary contacts 1000) in the base described according to FIG. 10.

Figure 12:
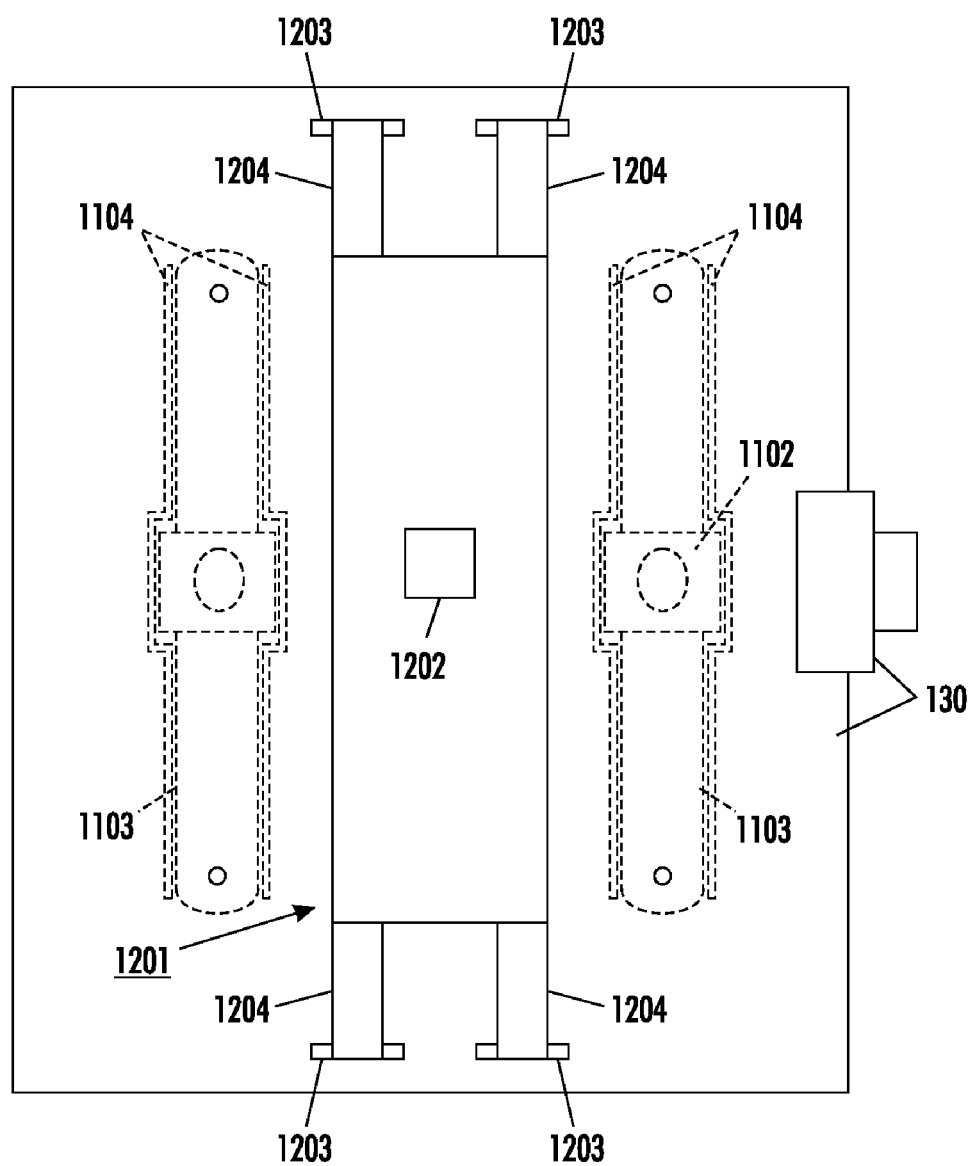
FIG. 12 is a diagram illustrating a spring operatively coupled to an actuator for use in a switch.

Referring also to FIG. 12, there is shown a diagram illustrating a spring 1201 operatively coupled to an actuator 130 for use in the switch. The spring 1201 is coupled to the actuator 130 by the four legs 1204 of the spring 1201 fitting into four recessed areas 1203 of the actuator 130. The four legs 1204 each form an angle with the body of the spring 1201, thus supporting the body of the spring 1201 to stand away from the actuator 130. The center hole 1202 of the spring 1201 is used to engage depressions or dimples in the cover of the switch to positively position the springs, and thereby the actuator 130 and thus the contacts 1000, 1103 during operation of the actuator 130.

Dashed outlines are used in FIG. 12 for the slide contacts 1103 and the ribs 1104 to show that the slide contacts 1103 and the ribs 1104 used to secure the slide contacts 1103 in place are on the opposite side of the actuator 130 relative to the spring 1201. In one embodiment, a completed switch assembly the spring 1201 would face the cover of the switch while the slide contacts 1103 would face the base of the switch.

Figure 13:
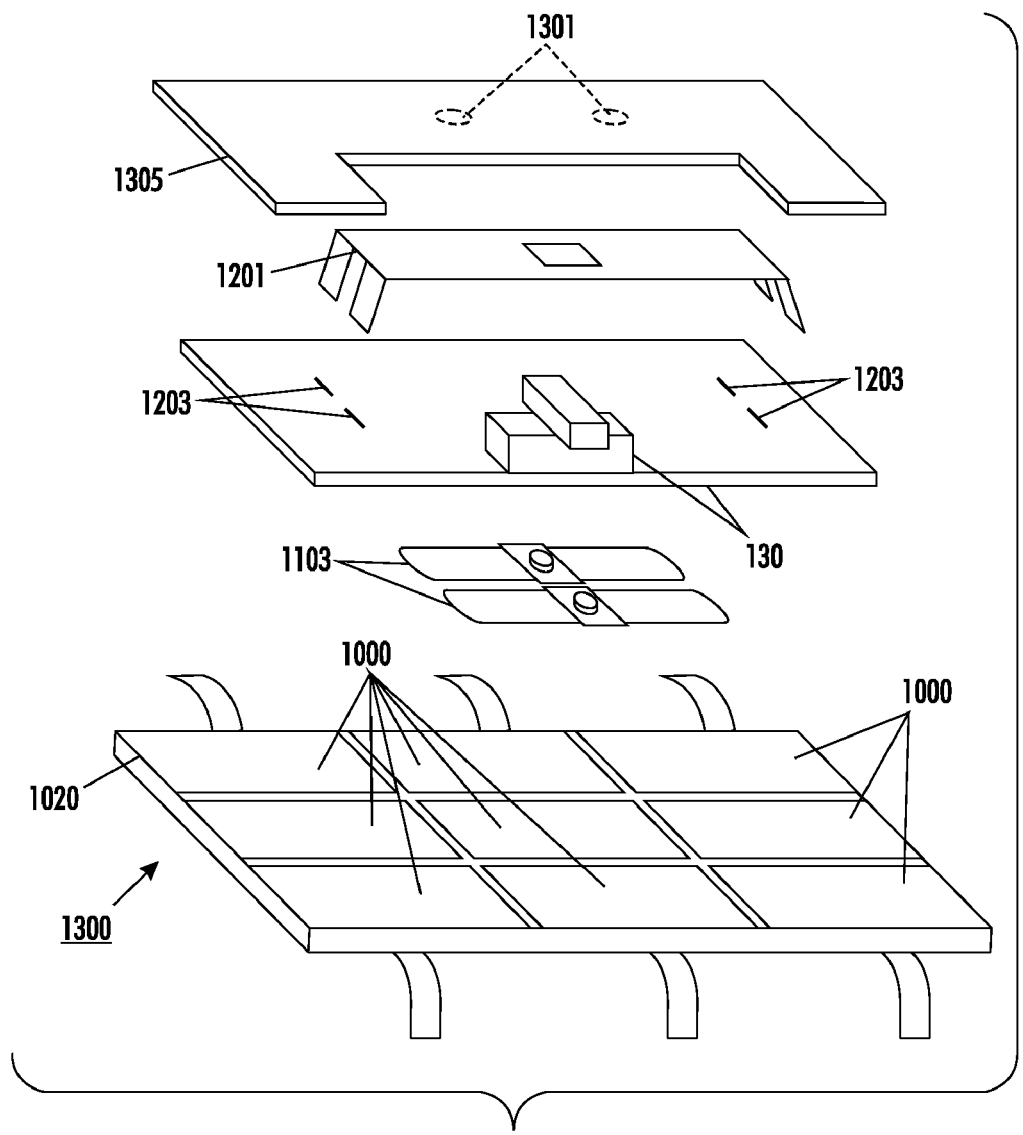
FIG. 13 is a diagram illustrating various parts of a switch.

Considering also FIG. 13, the assembly diagram illustrates several of the previously described parts of the switch 1300. The base 1020 is shown facing the slide contacts 1103. The slide contacts 1103 face the actuator 130 on one side of the slide contacts 1103 and face the base 1020 on the opposite side of the slide contacts 1103. The actuator 130 contains ribs (not shown) that engage a middle area of the slide contacts 1103 to secure the slide contacts to the actuator 130. The actuator 130 of the switch is shown. The actuator 130 will be attached to a tab, the tab extending through an aperture in the battery case as previously described. On the ends of the slide contacts 1103, facing the base 1020 are points of contact that make contact with the stationary contacts 1000 of the base 1020. The spring 1201 faces the actuator 130. In a fully assembled switch, the spring 1201 is operatively coupled to the actuator 130 by the four legs of the spring 1201 fitting into the recessed areas 1203 of the actuator 1303. Furthermore, the cover 1305 faces the spring 1201. On the inside of the cover 1305, facing the spring 1304, are two dimples 1301, and the convex dimples 1301 face the spring 1201. The concave side of each dimple 1301 faces outward from the mechanism of the switch.

In one alternative embodiment, it will be appreciated that the switch configuration described above may be modified so that it is the actuator that is affixed to the circuit board and the tab removably affixed to the switch body. In such an embodiment, the tab would, once again, cause relative movement between the sliding and fixed contacts and result in the switch changing from an open to a closed state to complete the discharge circuit. Hence, it is the relative movement between the switch components (fixed and stationary contacts) that is achieved in response to pulling on the tab. The switch embodiments disclosed are not intended to be specifically limited to the embodiment of FIGS. 10-13. It will also be recognized that various switch styles and configurations may be employed in alternative embodiments of the present invention. In one embodiment, the switch may be a surface-mount style switch. Similarly, through-hole or remote-mount style switches may be employed depending upon the configuration of the discharge circuit (conventional circuit board, hard-wired, flexible circuit construction, etc.), the battery itself, as well as the battery housing; and the present invention is not intended to be limited to a particular style of switch.

In a further alternative embodiment, the switch may be an opto-electronic device that is sensitive to a source of light energy (visible or infrared). For example, in one alternative embodiment, the switch may be an optical switch whereby the connection of the complete discharge circuit to the battery is achieved when light is sensed by the optical switch. The source of light energy may be an ambient or other external source that is received when the tab removes a cover from the active surface of the optical switch. In other words, the tab acts as a shade that prevents light from impinging upon the optical switch and activating the discharge circuit. Removing the tab allows light to enter the switch and to initiate discharge. In a further alternative embodiment, the tab may also be used to activate a switch as previously described, but where the switch itself closes a contact to provide power to an artificial light energy source (e.g., LED, lamp, etc.) that then triggers the optical switch as described.

Figure 14:
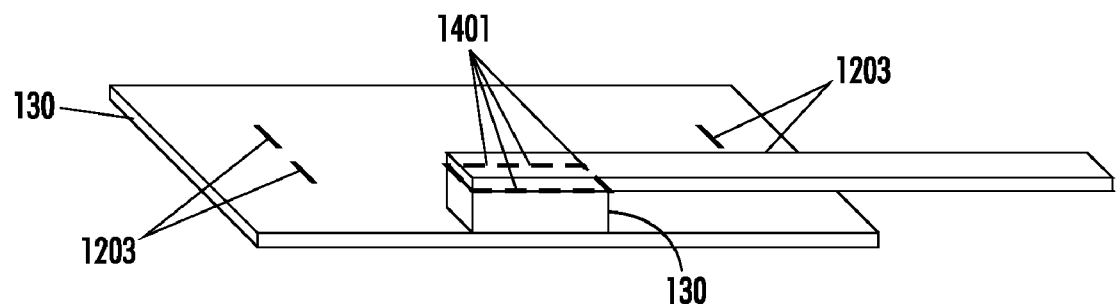
FIG. 14 is a diagram illustrating an actuator.

In reference now to FIG. 14, a diagram illustrating a tab 120 of an actuator 130 is shown. In one embodiment the tab 120 and actuator 130 are integral. Nevertheless, although the actuator is of one piece, a perforation 1401 is made in the actuator 130 to facilitate the detaching feature. The tab 120 and the actuator 130 are detached or broken apart when a user pulls the tab 120 through the aperture of the battery case and continues pulling after the switch is moved to the activated position as described above.

Figure 15A:
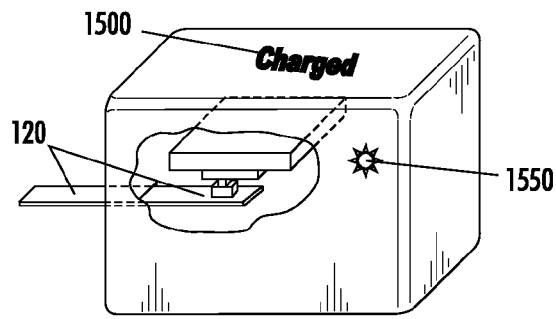
FIG. 15A is a diagram illustrating a battery with a charge indicator.
Figure 15B:
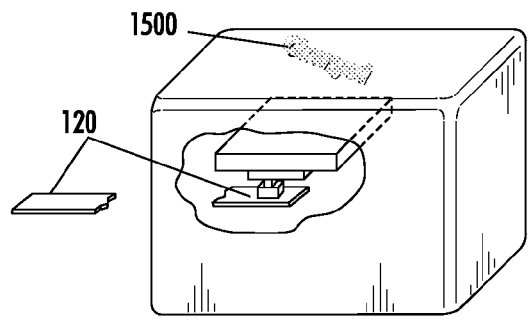
FIG. 15B is a diagram illustrating a battery with a charge indicator.
Figure 15C:
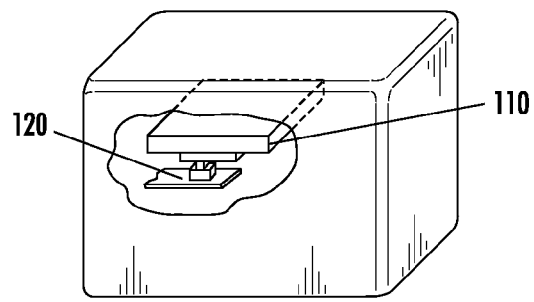
FIG. 15C is a diagram illustrating a battery with a charge indicator indicating no charge.

In reference now to FIGS. 15A-C, there are shown several embodiments of an indicator (1500, 1550) suitable for indicating when the complete discharge device (CDD) has been activated. In one embodiment, the indicator may be a simple light-emitting diode(s) 1550 that is initially "on" or lit when the complete discharge device is activated. The user may verify complete battery discharge when the switch is activated, and confirms complete discharge when the light-emitting diode 1550 is no longer lit—indicating no remaining power, or at least below a level suitable to power the light emitting diode(s).

In an alternative embodiment, a thermochromatic ink is used to permanently indicate whether a battery has been discharged. After manufacture, indicia 1500 on the battery, printed with thermochromatic ink, indicates that the battery is charged. The thermochromatic ink chosen does not react to temperatures in a range of normal operating temperatures, and below the range of battery surface temperature generated by the resistor of the discharging circuit 110. However, the thermochromatic ink will respond to temperatures created by a resistor in the complete discharge circuit when discharging takes place. It will be appreciated that such a discharging circuit may employ a constant resistance or a constant current circuit. It is noted that battery surface temperature generated by a discharging circuit 110 can vary depending on the properties of the discharge circuit, the insulative properties of the battery case and other insulative materials that may be present.

When discharging is initiated, the resistor of the discharging circuit will generate sufficient heat, heat that will radiate to the surface of the battery where the indicia 1500 are printed. The raised battery surface temperature, caused by the heat of the discharge circuit, will in turn cause the thermochromatic ink to become invisible to the unaided eye—thereby providing positive indicia of complete discharge of the battery. An example of the type of ink employed in a printed indicator is found, for example, in U.S. Pat. No. 5,758,224 to Binder et al., the entire contents of which are hereby incorporated by reference for their teachings. Other thermochromatic inks or materials that respond to varying temperature ranges, including alternatives that change from invisible to visible in response to increased temperature, are known to those skilled in the art and will be recognized as alternatives to the described embodiment.

In FIG. 15B, the discharge of the battery was initiated by the removal of the first member of the tab 120. The indicia 1500 on the battery begins to react to the heat generated by the resistor of the discharge circuit 110. Then, as illustrated in FIG. 15C, the indicia 1500 that originally indicated the battery was charged is no longer visible to the unaided eye, thus indicating that the battery has been completely discharged. The user of the battery thus has two visible pieces of evidence that the battery has been discharged: (i) the tab 120 used to initiate discharge has been removed; and (ii) the charge-indicating indicia 1500 are not visible. It is further contemplated that the thermochromatic label may be augmented or replaced by other signaling devices. Examples of such devices include the light emitting diode, an incandescent light or a liquid crystal display or similar device as described above to provide a positive visual indication to the user when the complete discharge circuit has been activated, i.e., upon pulling of the tab. Similarly, a signal of the discharge circuit activation may be achieved using a sound-producing device such as a buzzer, or a vibratory device to provide an inaudible, but touch-sensitive signal. It will also be appreciated that a combination of signaling devices may be used in combination to provide a plurality of perceptible signals that discharge has begun and/or is completed.

Figure 16:
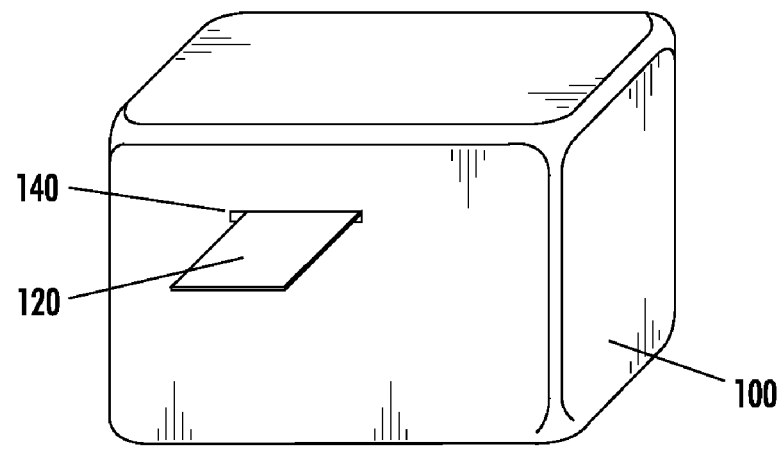
FIG. 16 is a diagram illustrating a tab attached to a battery case.

In reference now to FIG. 16, a diagram illustrating a tab 120 extending from a battery case 100 is shown. In this embodiment, a protective cover for the tab 120 of the switch of the discharge circuit is not used. The user must pull the tab 120 through the aperture 140 in order to initiate the discharge of the battery. It is noted that various methods of attaching the portion of the tab 120 that extends through the aperture 140 to the battery case 100 are known to those skilled in the art. Such methods may include using a temporary adhesive weak enough permit the end of the pull tab to be manually separated from the battery case through effort by a user of average strength. Another method may be to strongly bind the end of the tab 120 to the battery case 100 but allow the portion of the case 100 to which the tab 120 is attached to be removable.

Figure 17:
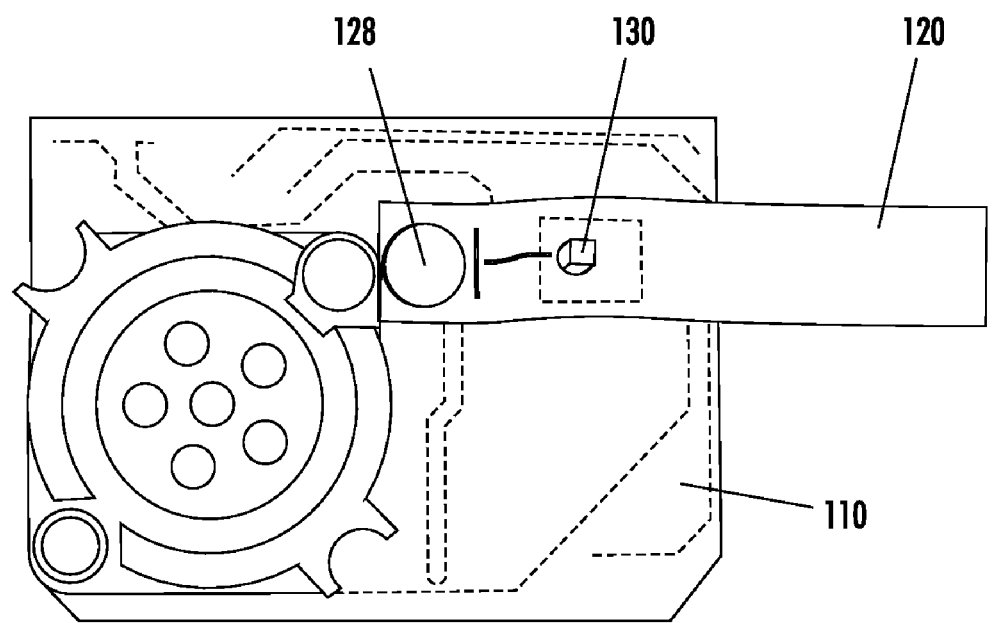
FIGS. 17 and 18 are illustrations of an alternative embodiment of the tab and switch arrangement in accordance with the present invention.
Figure 18:
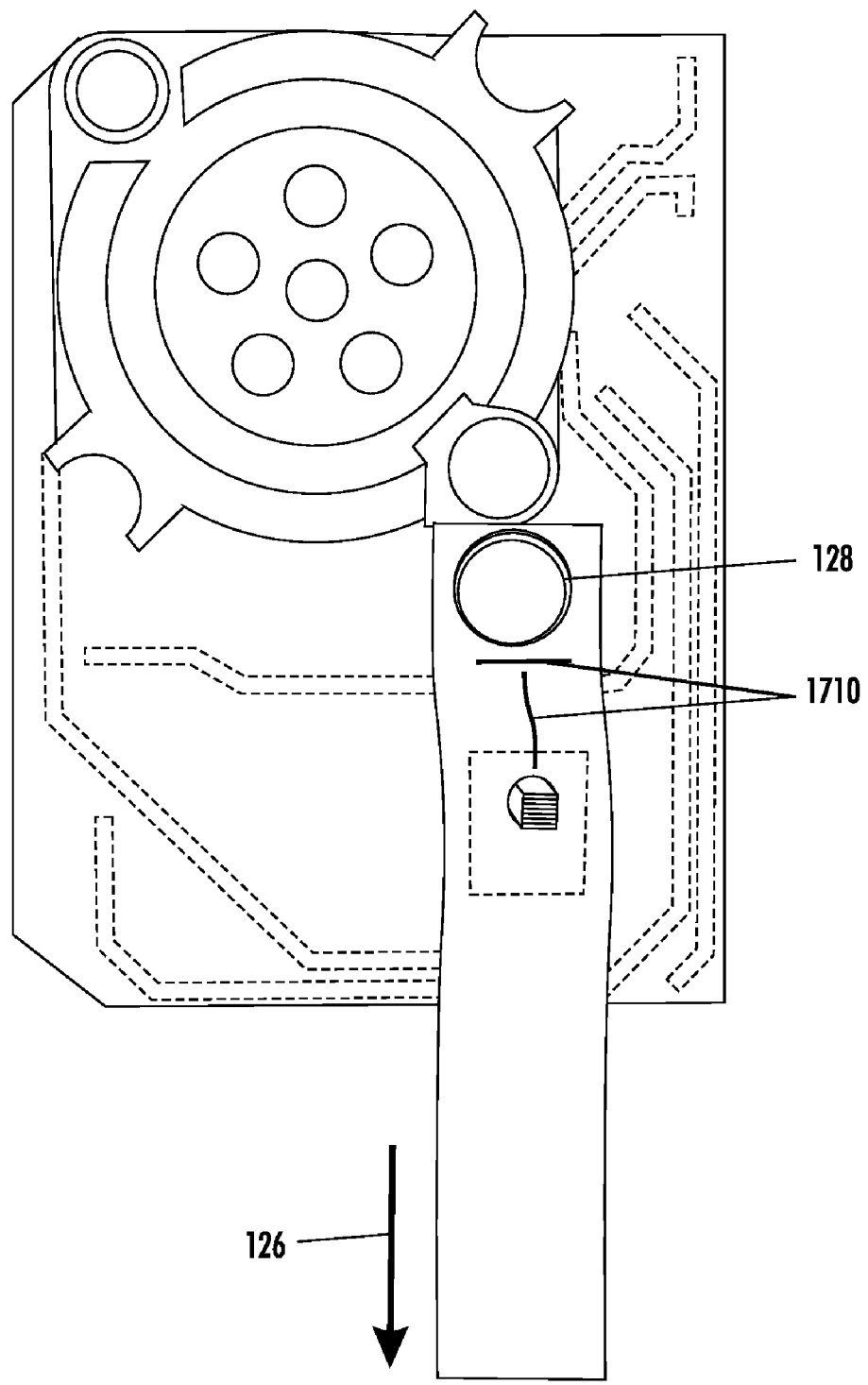

Referring next to FIGS. 17 and 18, depicted therein is another alternative embodiment of the present invention wherein the tab 120 is staked to the discharge circuit or board 110 to both prevent inadvertent actuation of the switch and the cause the tab to remain attached to the actuator of the switch during operation as will now be described. The figures show a switch with an actuator 130, the actuator 130 having a tab 120. The switch is operatively coupled to a discharge circuit 110, connected to the battery (not shown), and the tab 120 is of sufficient length to extend through an aperture in the battery case (not shown).

In order to completely discharge the battery, a user pulls the tab 120 out of the battery case in the manner previously described. As the tab 120 is pulled, the tension in the tab 120 both causes the tab to separate or become detached from the stake or plastic rivet 128 that is employed to attach the tab to the circuit 110. Although characterized as a stake or rivet, it will be appreciated that various mechanical means (including screws, hook-loop fasteners, etc.) or adhesive means, may be used to anchor the tab 120 against inadvertent activation.

The perforation(s) 1710 is particularly designed so as to permit the tab to break or rip away from the circuit 110 along the perforation 1710 as the tab is pulled. Concurrently, the tab exerts a force on the actuator 130 in the direction of the arrow (126), by the remaining, non-separated end section of the tab, which in turn causes the actuator 130 to move the contacts of the switch into an activated position.

The activated or "closed" position is the position at which a circuit including the poles of the battery, the discharging circuit and the contacts of the switch is completed, thus initiating the complete discharge of the battery. Continued pulling of the tab 120 after the actuator of the switch is in the activated position does not cause further motion of the actuator of the switch; instead, the continued tension on the tab 120 causes the tab 120 to detach from the actuator 130, thereby removing the tab 120 from the battery case (not shown).

Lines of possible locations for perforations 1710, like the perforation lines in the embodiment of FIG. 5 are deigned to facilitate the intentional separation of tab 120—initially from the circuit 110 and then from the switch actuator 130, but only after the tab has been pulled to a degree that causes the switch actuator 130 to move and activate the discharge circuit. It is noted that various perforation designs, besides those illustrated in FIG. 18, may be employed to facilitate the decoupling of the tab 120 from the circuit 110 and the actuator 130.

Furthermore, perforations may not be necessary to enable the decoupling of the tab 120 from the rivet 128 or actuator 130. The tab 120 may be constructed of material with sufficient tensile strength to move the actuator 130 into the activated position but insufficient tensile strength, due to the combination of the material and perforations, to prevent the tab 120 from tearing away from the actuator 130 in response to continued tension on the tab 120 after the actuator of the switch is moved to the activated position.

While various examples and embodiments of the present invention have been shown and described, it will be appreciated by those skilled in the art that the spirit and scope of the present invention are not limited to the specific description and drawings herein, but extend to various modifications and changes.

What is claimed is:

1. An apparatus for completely discharging a battery enclosed within a battery case, comprising:
   a discharging circuit operatively coupled to a first pole of the battery; and
   a switch electrically coupled between the discharging circuit and a second pole of the battery;
   said switch including a first contact, a second contact and an actuator, the actuator having a tab extending therefrom through an aperture in the battery case, wherein upon pulling the tab, the actuator causes relative movement between the first and second contacts to complete an electrical connection of the discharging circuit to the poles of the battery, and where the tab becomes detached from the actuator, wherein a first end of the tab is permanently affixed to a circuit board including the discharge circuit, and where the tab includes at least one perforation adjacent the first end thereof to permit the first end of the tab to be separated from the circuit board upon the application of force to an opposite end of the tab.

2. The apparatus of claim 1 wherein the tab further includes:
   an aperture through which the actuator extends; and
   a second perforation, said second perforation permitting the tab to be separated from the actuator upon further application of force to an opposite end of the tab.

3. An apparatus for completely discharging a battery enclosed within a battery case, comprising:
   a discharging circuit operatively coupled to a first pole of the battery; and
   a switch electrically coupled between the discharging circuit and a second pole of the battery;
   said switch including a first contact, a second contact and an actuator, the actuator having a tab extending therefrom through an aperture in the battery case, wherein upon pulling the tab, the actuator causes relative movement between the first and second contacts to complete an electrical connection of the discharging circuit to the poles of the battery, and where the tab becomes detached from the actuator, wherein the tab includes a shaped receiver and the tab is coupled to the actuator via a portion of the actuator located within the shaped receiver, and where the shaped receiver includes a shaped hole and where the tab is placed so that the portion of the actuator extends into the shaped hole and upon moving the tab to an operative position the tab thereby remains operatively connected to the actuator.

4. The apparatus of claim 1 wherein the tab comprises an electrically conductive material.

5. The apparatus of claim 1 wherein the tab comprises an electrically insulative material.

6. The apparatus of claim 1 further comprising an adhesive applied between the tab and the actuator to couple the tab to the actuator.

7. The apparatus of claim 1 further comprising a binding tape to couple the tab to the actuator.

8. The apparatus of claim 1 further comprising a heat stake to couple the tab to the actuator.

9. The apparatus of claim 1 wherein the tab further comprises a perforation such that the perforation facilitates detaching of the tab from the actuator after the actuator is moved to activate the discharge circuit.

10. The apparatus of claim 1 further comprising a protective cover, the protective cover being removably attached to the battery case and covering at least a portion of the tab extending through the aperture, wherein removing the protective cover exposes the tab.

11. The apparatus of claim 10 wherein the protective cover is permanently attached to the tab such that removing the cover pulls the tab through the aperture.

12. The apparatus of claim 1 further comprising an indicator, said indicator showing when the discharging circuit is activated.

13. The apparatus of claim 12, wherein said indicator includes a light emitting diode visible on a surface of the battery case.

14. The apparatus of claim 12, wherein said indicator includes a thermochromatic ink display with visible indicia, said display being positioned on the battery case sufficiently close to a resistor of the discharging circuit such that the battery case surface temperature generated by the resistor upon discharge causes the indicia to signify that the discharge circuit has been activated.

15. An apparatus for completely discharging a battery enclosed within a battery case, comprising:
   a discharging circuit operatively coupled to a first pole of the battery; and
   a switch electrically coupled between the discharging circuit and a second pole of the battery;
   said switch including a first contact, a second contact and an actuator, the actuator having a tab extending therefrom through an aperture in the battery case, wherein upon pulling the tab, the actuator causes relative movement between the first and second contacts to complete an electrical connection of the discharging circuit to the poles of the battery, and where the tab becomes detached from the actuator, wherein said switch further comprises:

first contacts that are stationary contacts electrically insulated from one another;

the movable contact including a sliding contact, wherein upon movement of the actuator the sliding contact engages a stationary contact causing an electrical connection therebetween;

a spring operatively coupled to the actuator and the sliding contact, the spring controlling the activation force for the switch; and a cover enclosing the sliding contact, the actuator and the spring.

* * * * *